(12) United States Patent
Cianciolo

(10) Patent No.: US 7,219,590 B2
(45) Date of Patent: May 22, 2007

(54) METHOD FOR POSITIONING A BODY ALONG CONTINUOUS-RANGE INCLINATION AND ROTATION ANGLES

(75) Inventor: Salvatore Cianciolo, Salem, NH (US)

(73) Assignee: Textron Systems Corporation, Wilmington, MA (US)

( * ) Notice: Subject to any disclaimer, the term of this patent is extended or adjusted under 35 U.S.C. 154(b) by 21 days.

(21) Appl. No.: 10/952,113

(22) Filed: Sep. 28, 2004

(65) Prior Publication Data

US 2005/0132874 A1    Jun. 23, 2005

Related U.S. Application Data

(62) Division of application No. 10/724,855, filed on Dec. 1, 2003, now Pat. No. 6,820,531.

(51) Int. Cl.
*F41A 27/14* (2006.01)
(52) U.S. Cl. ............... 89/37.12; 89/41.06; 89/41.07; 89/41.08
(58) Field of Classification Search ........... 89/37.05, 89/37.12, 40.02
See application file for complete search history.

(56) References Cited

U.S. PATENT DOCUMENTS

| | | | |
|---|---|---|---|
| 1,723,623 A | 8/1929 | Kennedy | |
| 2,248,072 A | 7/1941 | Fry | 172/293 |
| 2,307,582 A * | 1/1943 | Haberlin | 89/37.16 |
| 2,321,272 A | 6/1943 | Becwar | 250/33 |
| 2,360,248 A | 10/1944 | Mace | 250/33 |
| 2,362,199 A * | 11/1944 | Glowka | 89/37.19 |
| 2,715,776 A | 8/1955 | Knowles et al. | 33/49 |
| 2,787,193 A | 4/1957 | Herlach | 89/27 |
| 2,937,574 A | 5/1960 | Senft | 89/1.7 |
| 2,945,229 A | 7/1960 | Klauser | 343/754 |
| 3,117,320 A * | 1/1964 | O'Toole | 343/702 |
| 3,718,070 A | 2/1973 | Schneider, Jr. | 89/1.8 |
| 3,889,551 A | 6/1975 | Harmening | 74/469 |

(Continued)

FOREIGN PATENT DOCUMENTS

EP    1 134 839 A1    9/2001
FR    2 827 950       1/2003

*Primary Examiner*—Stephen M. Johnson
(74) *Attorney, Agent, or Firm*—Mills & Onello LLP

(57) ABSTRACT

In a system for controlling the inclination angle and rotation angle of a body, a rotary actuator is coupled to a base. A pivot actuator is coupled to an output shaft of the rotary actuator. The rotary actuator controls the angular position of the pivot actuator. A displacement member is coupled to an output shaft of the pivot actuator. The pivot actuator controls the linear position of the displacement member. A support shaft is pivotably coupled to the displacement member. A spherical bearing includes a socket that is coupled to the base and a ball that is coupled to the support shaft. In this manner, the angular position and linear position of the displacement member is translated to a corresponding rotation angle and inclination angle in the support shaft. This system provides for a continuous range of rotation of the upper body and a continuous range of inclination angles in the upper body relative to the lower base. An optional system for deploying the legs provides for continuous, controlled motion in their release. In doing so, the present invention provides a system with a higher degree of flexibility, precision and reliability.

25 Claims, 7 Drawing Sheets

U.S. PATENT DOCUMENTS

| | | | |
|---|---|---|---|
| 4,020,407 A * | 4/1977 | Clement et al. | 318/601 |
| 4,295,621 A | 10/1981 | Siryj | 248/183 |
| 4,409,468 A | 10/1983 | Mayer et al. | 235/404 |
| 4,501,188 A * | 2/1985 | Wroble | 89/41.02 |
| 4,691,207 A | 9/1987 | Timineri | 343/766 |
| 4,814,781 A | 3/1989 | DeHaven | 343/766 |
| 4,819,002 A | 4/1989 | Reboullet | 343/765 |
| 4,841,309 A | 6/1989 | Burr | 343/766 |
| 4,934,271 A | 6/1990 | Kensok et al. | 102/293 |
| 4,953,443 A | 9/1990 | Meier | 89/41.02 |
| 4,988,261 A | 1/1991 | Blatt | 414/749 |
| 5,107,716 A | 4/1992 | Torii et al. | 74/89.15 |
| 5,461,961 A * | 10/1995 | Baus et al. | 89/1.815 |
| 5,735,497 A | 4/1998 | Haas et al. | 248/181.1 |
| 5,794,541 A | 8/1998 | Hirose | 108/20 |
| 5,999,139 A | 12/1999 | Benjamin et al. | 343/765 |
| 6,019,154 A | 2/2000 | Ma et al. | 156/580 |
| 6,023,247 A | 2/2000 | Rodeffer | 343/765 |
| 6,236,906 B1 | 5/2001 | Müller | 700/258 |
| 6,328,269 B1 | 12/2001 | Krautloher | 248/288.11 |
| 6,571,678 B1 | 6/2003 | Bar | 89/41.02 |
| 6,577,281 B2 | 6/2003 | Yamamoto et al. | 343/766 |
| 2002/0109054 A1 | 8/2002 | Burr | 248/188.4 |
| 2003/0027641 A1 | 2/2003 | Parsons | 464/139 |
| 2003/0146355 A1 | 8/2003 | Burr | 248/188.4 |

* cited by examiner

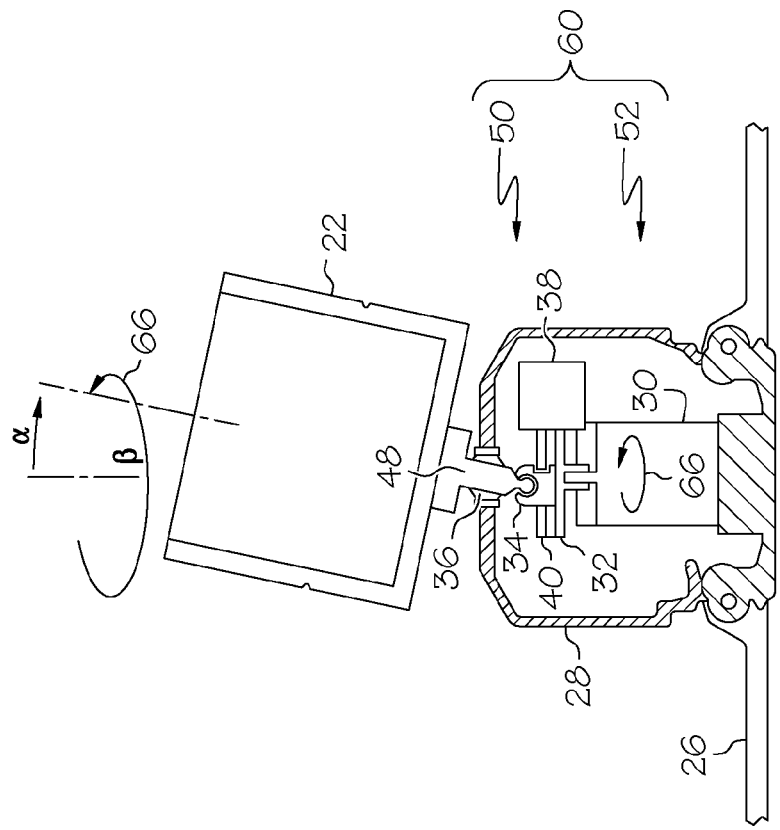
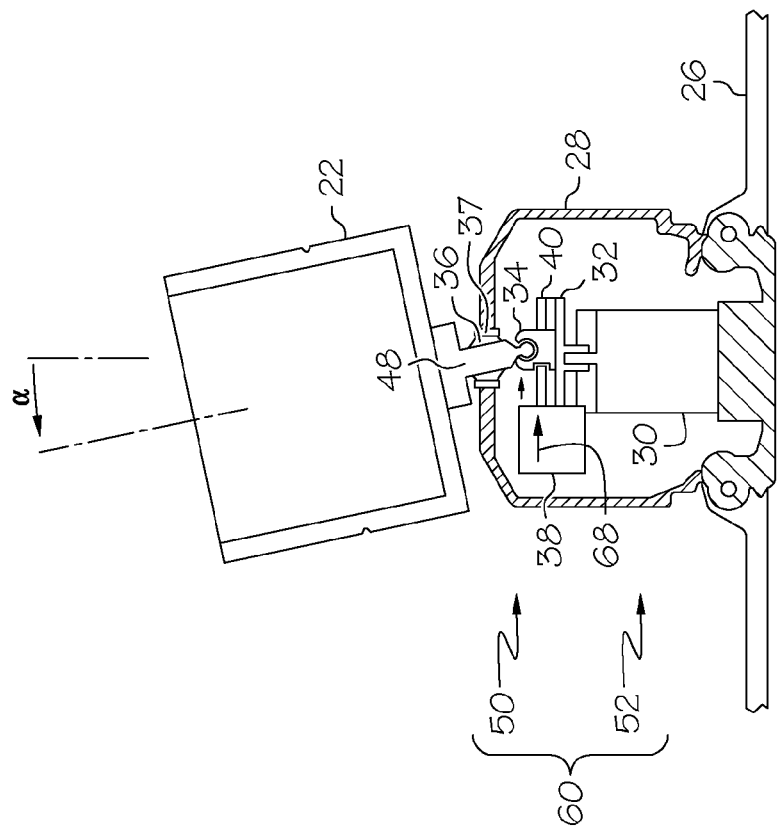

METHOD FOR POSITIONING A BODY ALONG CONTINUOUS-RANGE INCLINATION AND ROTATION ANGLES

RELATED APPLICATION

This application is a divisional of U.S. application Ser. No. 10/724,855, filed on Dec. 1, 2003 now U.S. Pat. No. 6,820,531, the contents of which are herein incorporated by reference in their entirety.

BACKGROUND OF THE INVENTION

Sensor or combined sensor-munition field units ("field units"), such as wide area munitions, are commonly distributed across a predefined region of a defensive position. Such units are deployed according to a number of techniques, including scattering from an air position, dropping from a moving truck, or hand-placement by installation personnel. Upon deployment, a field unit is required to right itself so that sensors can begin to sweep for threats or targets of interest.

A field unit may include a large upper body, e.g., in the shape of a canister, that is suspended above a lower base. The base may include various mechanisms for rotating and positioning the upper body. A plurality of feet or legs are typically released from the base for righting and stabilizing the unit. The upper body houses various systems which may include, for example, a munition or plurality of submunitions, antennae, seismic sensors, acoustic sensors, optic sensors, radar sensors, and the like.

Upon determination of a threat or target of interest, the base mechanism causes the upper body to cant or incline at a pre-defined angle and to rotate in order to orient the associated sensors or munitions in the general direction of the threat. Accordingly, additional data can be collected on the target, and, if desired, a munition launched in that direction.

In conventional field units, the upper body rotates relative to the base at fixed, indexed increments, for example at 9 degree increments, using complicated mechanical systems. In addition, the angle of the inclination is also fixed, for example, to a 45 degree inclination angle. Such units rely primarily on mechanical systems for righting and rotational positioning. They include for example, large-load springs that are used to deploy the feet for righting the unit. While such springs are the most reliable springs available, they tend to be single-use springs and are therefore expensive. In addition, they are difficult to replace and service, and in fact are dangerous for installation personnel, since untimely activation can result in severe injury.

In addition, the rotation mechanism, being fixed at 9 degree indexed increments, does not afford a high degree of precision that might otherwise be desired in modern tracking systems. This applies as well to the fixed 45 degree inclination angle of the upper body. Fixed inclination and rotation angles tend to limit the functionality and effectiveness of these units.

SUMMARY OF THE INVENTION

The present invention is directed to a system and method that address the limitations of the conventional approaches. In particular, the present invention provides a system by which a deployed field unit provides for a continuous range of rotation of the upper body and a continuous range of cant or inclination angle in the upper body relative to the lower base. An optional system for deploying the legs provides for continuous, controlled motion in their release. In doing so, the present invention provides a system with a higher degree of flexibility, precision and reliability.

In one aspect, the present invention is directed to a system for controlling the inclination angle and rotation angle of a body. A rotary actuator is coupled to a base. A pivot actuator is coupled to an output shaft of the rotary actuator. The rotary actuator controls the angular position of the pivot actuator. A displacement member is coupled to an output shaft of the pivot actuator. The pivot actuator controls the linear position of the displacement member. A support shaft is pivotably coupled to the displacement member. A bearing, for example a spherical bearing, includes a fixed portion that is coupled to the base and a moving portion that is coupled to the support shaft. In this manner, the angular position and linear position of the displacement member is translated to a corresponding rotation angle and inclination angle in the support shaft.

In one embodiment, the support shaft extends from the displacement member through the bearing. The bearing may comprise, for example, a spherical bearing, in which case, the fixed portion comprises a socket and the moving portion comprises a ball. A body, for example, comprising a munition, a plurality of submunitions, antenna, seismic sensor, acoustic sensor or optic sensor is coupled to the support shaft.

In another embodiment, the rotary actuator comprises a stepper motor. A platform is coupled to the output shaft of the rotary actuator, and the pivot actuator is coupled to the platform. The pivot actuator may comprise, for example, a linear actuator. In one example, the linear actuator comprises a stepper motor that induces motion in a threaded screw, and the displacement member comprises a displacement carriage, the threaded screw communicating with a corresponding thread in the displacement carriage for inducing linear motion in the displacement carriage. The linear actuator may further comprise a rail, and the displacement carriage is slidably mounted to the rail. In another example, the linear actuator comprises a stepper motor that induces linear motion in the output shaft, the output shaft communicating with the displacement member for inducing linear motion in the displacement member.

In another embodiment, the support shaft includes a spherical bearing and the displacement member includes a socket for communicating with the spherical bearing of the support shaft. Alternatively, the support shaft may include a disk bearing. The base may further comprise a shroud for housing the base, in which case the fixed portion of the bearing is coupled to the shroud. The weight of the body is substantially supported by the shroud.

In this manner, the rotary actuator controls the angular position of the pivot actuator over a continuous range of angular positions, and the pivot actuator controls the linear position of the displacement member over a continuous range of linear positions.

In another embodiment, a plurality of legs are rotatably coupled to the body. An articulated joint network couples the legs and a motor rotates the joint network for collectively deploying the legs.

In another aspect, the present invention is directed to a system for controlling the inclination angle and rotation angle of a body. The system includes a base, a rotary actuator, a linear actuator, and a displacement member. The linear actuator controls the linear position of the displacement member and the rotary actuator controls the angular position of the displacement member. A support shaft is pivotably coupled to the displacement member. A housing is coupled to the base for housing the rotary actuator, linear actuator and displacement member. A bearing includes a fixed portion that is coupled to the housing and a moving portion that is coupled to the support shaft. In this manner, the angular position and linear position of the displacement member is translated to a corresponding rotation angle and inclination angle in the support shaft.

In another aspect, the present invention is directed to a method for controlling the inclination angle and rotation angle of a body. The angular position of a displacement member is controlled about a longitudinal axis of a base over a continuous range of angular positions. The linear position of the displacement member is controlled relative to the longitudinal axis of the base over a continuous range of linear positions. The displacement member is pivotably coupled to a support shaft of the body at a first position of the support shaft and the support shaft is pivotably coupled to the base at a second position of the support shaft. In this manner, the angular position and linear position of the displacement member is translated to a corresponding rotation angle and inclination angle in the support shaft.

In another aspect, the present invention is directed to a method for positioning a body. A support shaft is moved through a continuous range of inclination angles relative to a base. The support shaft is rotated through a continuous range of rotation angles about an axis of rotation. A body coupled to the support shaft is thereby moved to a desired rotation angle and inclination angle.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5A is a sectional side view of the embodiment of FIG. 1, illustrating the operation of the pivot actuator, in accordance with the present invention. FIG. 5B is a sectional side view of the embodiment of FIG. 1, illustrating the operation of the rotary actuator, in accordance with the present invention.

DETAILED DESCRIPTION OF PREFERRED EMBODIMENTS

Figure 1:
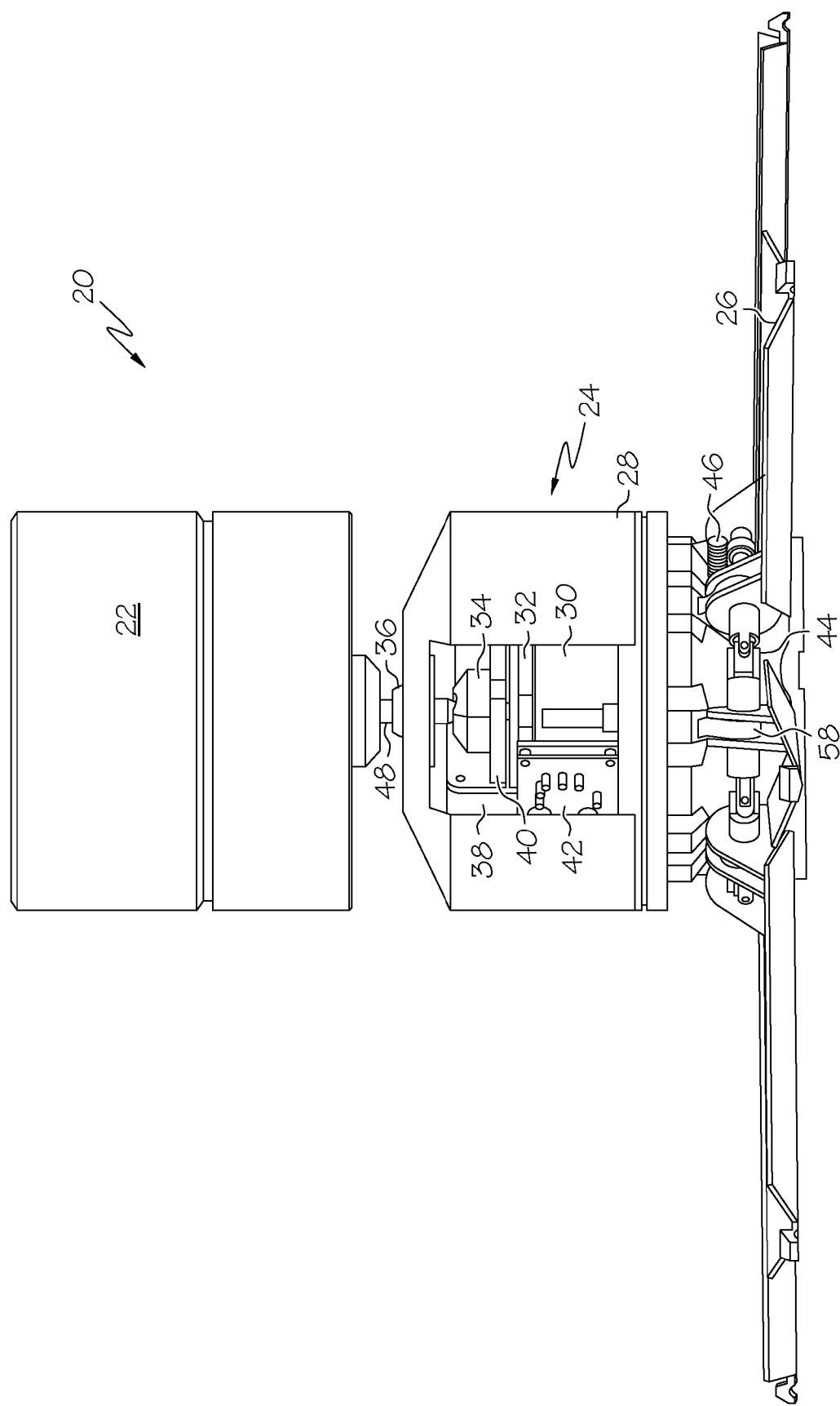
FIG. 1 is a cutaway side view of an embodiment of the present invention.

With reference to FIG. 1, a field unit employing a positioning system in accordance with the present invention includes an upper body 22, a base 24 and a plurality of legs 26. In this embodiment, the field unit 20 is generally cylindrical in shape. Other shapes are equally applicable to the principles of the present invention.

The legs 26 are distributed about the lower perimeter of the base 24, and are hinged to the base 24. In one embodiment, a linear motor 46 is used to drive a dual-articulated joint network 44 that is coupled to all legs 26. In this manner, the motor 46 and joint network 44 controls the lowering of the legs 26 into position, allowing for greater control and precision over that function. The legs 26 may optionally be spring-loaded, to assist the motor 46 in their deployment. The legs may be outfitted with one or more optional clutches that would allow one or more of the legs to slip, relative to the joint network 44, if needed, for example in the case where a certain amount of torque is exceeded in driving the legs.

The use of one or more clutches may allow a field unit to self-right itself from a horizontal position to a desired orientation even though one or more legs are obstructed, e.g., by a rock or tree branch. In such situations, the unobstructed legs operate and deploy normally due to the clutch slippage, while the obstructed leg(s) remain partially-deployed or non-deployed. Such clutches may also facilitate retrieval of deployed field units by allowing the legs easily to move to a stowed position.

The base 24 includes a pivot or linear actuator 50 and rotary actuator 52 that serve to pivot and rotate the upper body 22 with respect to the base 24. Operation and composition of the pivot or linear actuator 50 and rotary actuator 52 are discussed in further detail below with respect to FIGS. 3, 4, and 5A–5B. The base 24 includes a shroud 28 that operates to protect the inner components of the base 24, while, according to the present invention, also serves to support the weight of the upper body 22, as described in further detail below. The shroud may be formed of any of a number of suitable materials such as plastics, composites, alloys, or sheet metals, and may be formed into shape by any of a number of suitable methods including, for example, die casting, pressing or machining.

The upper body 22 can be any shape and can be made from any suitable material. For example, the upper body 22 may comprise a cylindrical canister 23, as shown, that houses any of a number of systems, including, for example, a munition or plurality of submunitions, antennae, seismic sensors, acoustic sensors, optic sensors, radar sensors, and the like, as described above. Owing to the amount of systems and components that are likely to be housed in the upper body 22, the upper body 22 tends to have a large weight that is burdensome to orient in the conventional systems described above. Because of the large weight, the conventional systems require complex, heavy, and therefore expensive mechanical systems for performing the orienting function.

The present invention, however, alleviates this burden by coupling the upper body 22 to the shroud 28 of the base 24 using a gimbal, for example in the form of a spherical bearing 36. In this example, a support shaft 48 extends from a lower portion of the upper body 22, and the support shaft 48 is coupled to the ball, or moving portion, of the spherical bearing 36. The bearing housing 37, or socket, is fixedly mounted to the top of the shroud 28 (see, for example, FIG. 4 discussed below) and the spherical bearing 36 rotates freely relative to the bearing housing 37. The support shaft 48 extends through the shroud 28 and interfaces with the positioning actuator 60 of the upper body 22, comprising the linear actuator 50 and rotary actuator 52, that are located in the base (see, for example, FIG. 3 discussed below). In this manner, the spherical bearing 36 and shroud 28 bear a substantial amount of the weight of the upper body 22, while relatively little of the load of the upper body 22 is transferred to the positioning actuator 60 through the support shaft 48. This allows for the positioning actuator 60 to be formed of relatively small, precise, lightweight, and inexpensive components, while affording an advanced level of precision in positioning the orientation of the upper body 22. The spherical bearing 36 may comprise, for example, a bearing of the type available from The Torrington Company, Torrington, Conn.

Figure 2:
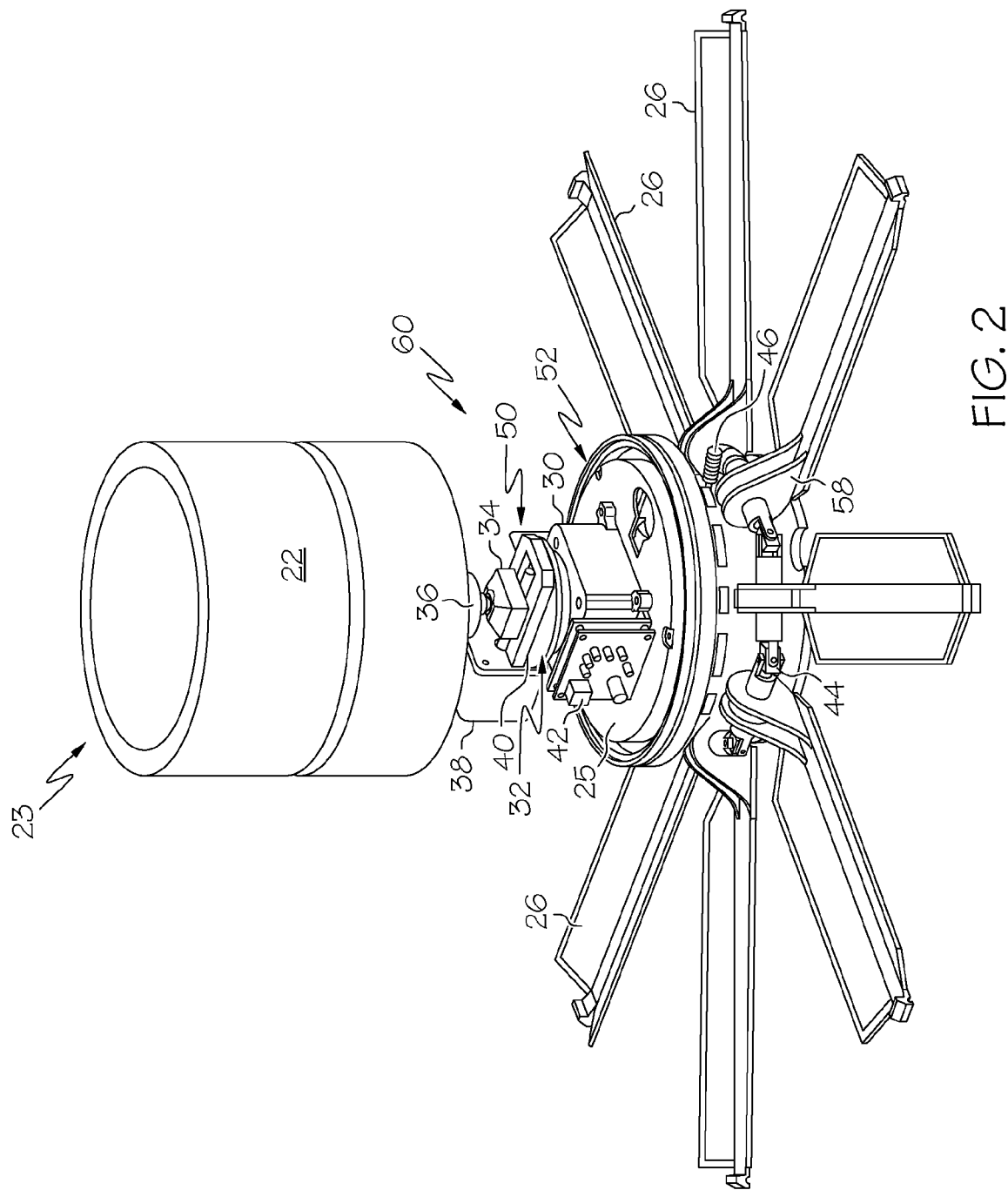
FIG. 2 is a perspective view of the embodiment of FIG. 1, with the outer shroud of the base removed for further viewing of internal components.

FIG. 2 is a perspective view of the embodiment of FIG. 1, with the outer shroud 28 of the base 24 removed. In this view, it can be seen that the upper body 22 is in the general shape of a canister that is used to contain various systems. In addition, the components of the positioning actuator 60 are exposed. As mentioned above, the positioning actuator 60 includes a pivot or linear actuator 50 and a rotary actuator 52.

The linear actuator 50 includes, in this example, a linear stepper motor 38 that operates to drive a carriage 34 along a rail 40 in a linear direction, as shown. The carriage 34 includes a socket 35 (see FIG. 3, discussed below) that interfaces with a support shaft bearing 54 (see FIG. 4, discussed below) located at an end of the support shaft 48. In this manner, linear movement of the carriage 34, as generated by the linear actuator 38, is applied to the support shaft bearing 54, which when moved, induces movement of the upper body 22 in an opposite direction, since the position of the spherical bearing 36 is fixed in the shroud 28 and thus, the spherical bearing 36 operates as a pivot point. The linear stepper motor 38 of the linear actuator 50 may comprise any of a number of suitable motors, for example, the AH Linear Actuator Series motors, available from Anaheim Automation Inc., Anaheim, Calif.

The linear actuator 50 assembly is in turn mounted to a rotary platform 32 that is positioned on a top portion of the rotary actuator 52. The rotary actuator 52 comprises, in this example, a rotary stepper motor 30 that is mounted to the base housing 25. The stepper motor 30 includes a vertical motor shaft that is coupled to the platform 32. In this manner, rotary motion in the rotary actuator 52, as generated by the stepper motor 30 operates to rotate the pivot actuator assembly 50. Rotation of the linear actuator assembly 50, in turn, induces a rotary movement in the upper body 22.

A circuit panel 42 is mounted to the base 24 for controlling the operation of the stepper motor 30, the linear actuator motor 38, and/or the leg motor 46. The circuit panel 42 receives commands from system electronics, such commands being related to the desired pivot angle and/or desired rotation angle of the upper body 22, and/or related to the deployment of the legs 26 by leg motor 46.

Figure 3:
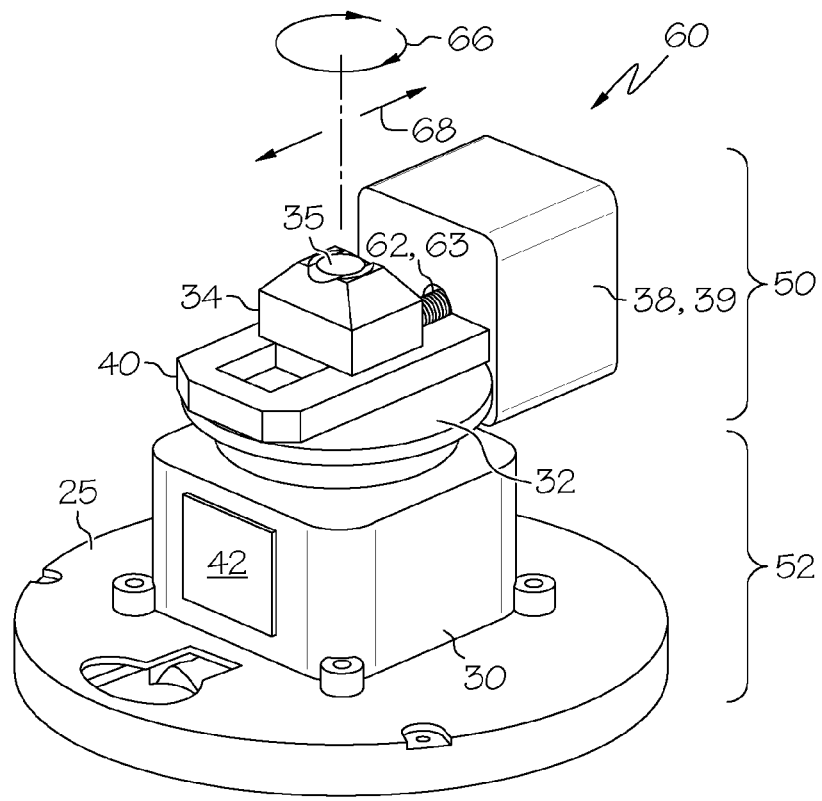
FIG. 3 is a perspective view of the positioning actuator of the embodiment of FIG. 1, in accordance with the present invention.
Figure 4:
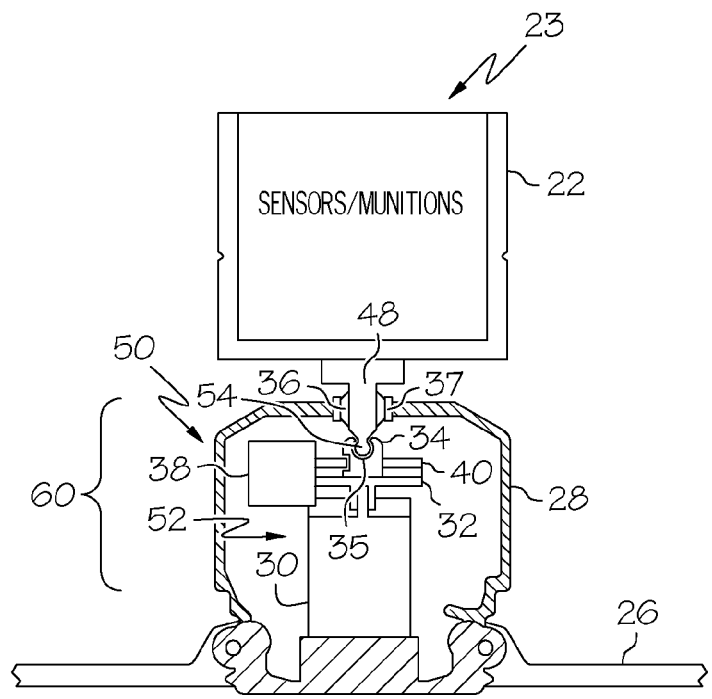
FIG. 4 is a sectional side view of the embodiment of FIG. 1, in accordance with the present invention.

FIG. 3 is a perspective view of the positioning actuator 60 of the embodiment of FIG. 1, in accordance with the present invention. As described above, the positioning actuator 60 includes a rotary actuator 52, for inducing and controlling the rotation of the upper body 22, and a pivot actuator 50, for inducing and controlling the pivot angle, or inclination angle, of the upper body 22.

The rotary actuator 52 comprises, in this example, a high-torque stepper motor 30 that is mounted to the base housing 25. The stepper motor 30 provides for precise control over the angular position of the platform 32 that is attached to the shaft of the motor 30. The motor 30 induces rotation in the pivot actuator 50 in a direction as indicated by arrow 66. The rotary stepper motor 30 of the rotary actuator 52 may comprise any of a number of suitable motors, for example, the L Series High-Torque Step motors, available from Anaheim Automation Inc., Anaheim, Calif.

The linear or pivot actuator 50 comprises, in this example, a linear stepper motor 38, a pivot bracket, or rail, 40 and a carriage 34. The rail 40 is coupled to the platform 32 and rotates with the platform 32. The linear stepper motor 38 is likewise coupled to the rail 40 and platform 32. The carriage 34 is configured to slide in a linear direction relative to the rail 40. A shaft 62 engages the carriage 34 to control the linear position of the carriage 34 relative to the rail 40 in a direction as indicated by arrows 68.

In one embodiment, as shown in FIG. 3; the shaft 62 may comprise a threaded drive screw, rotated by a rotary stepper motor 38; that engages a corresponding female thread in the carriage 34. In this manner, rotation in the screw 62 induces linear motion in the carriage 34. In another embodiment, as shown in FIG. 3; the motor may comprise a linear stepper motor 39 that includes a non-threaded shaft 63. In this embodiment, the non-threaded shaft 63 extends from the body of the motor by an amount that is under the precise control of the motor. The end of the shaft 63 in turn engages the carriage 34 for inducing linear motion in the carriage 34 with respect to the rail 40 under the control of the motor 39.

The carriage 34 includes a socket 35 in an upper portion thereof that is configured to engage with a corresponding bearing 54 on the end of the support shaft 48 of the upper body 22. With reference to the sectional side view of FIG. 4, the support shaft 48 extends from a lower portion of the upper body and is mounted to the spherical bearing 36 that rotates within the bearing housing 37. The bearing housing 37 is in turn mounted to an upper portion of the shroud 28. A support shaft bearing 54 is located at an end of the support shaft 48, and mates with the socket 35 of the carriage 34, for example in a slip-fit relationship.

In this manner, the linear and angular position of the carriage 34, as directed by the positioning actuator 60, operates to control the position of the support shaft bearing 54, relative to the spherical bearing 36. This, in turn, operates to control the tilt angle and rotational position of the upper body 22, relative to the base 24, while limiting the amount of torque applied to the positioning actuator 60, by primarily supporting the weight of the upper body 22 using the shroud 28.

FIG. 5A is a sectional side view of the embodiment of FIG. 1, illustrating the operation of the pivot actuator 50, in accordance with the present invention. In this example, it can be seen that the linear actuator motor 38 is activated to induce linear motion in the carriage 34, in the direction of arrow 68. As a result of the linear motion of the carriage in the direction of arrow 68, the support shaft 48 becomes tilted with respect to the shroud 28, and an inclination angle a is induced in the upper body 22.

FIG. 5B is a sectional side view of the embodiment of FIG. 1, illustrating the operation of the rotary actuator 52, in accordance with the present invention. In this example, assuming the inclination angle α to have been previously selected, the rotary stepper motor 30 is activated to induce rotational motion of the platform 32, and the corresponding pivot actuator 50, in the direction of arrow 66. As a result of the rotational motion of the platform in the direction of arrow 66, the support shaft 48 swivels with respect to the shroud 28 via spherical bearing 36, and the upper body is rotated by an angular displacement amount β, of 180 degrees in this example.

While the above example illustrates rotational orientation of the upper body 22 following inclination angle α positioning, the present invention is equally applicable to embodiments that induce rotational orientation of the upper body 22 during inclination angle α positioning, and prior to inclination angle α positioning.

Figure 6A:
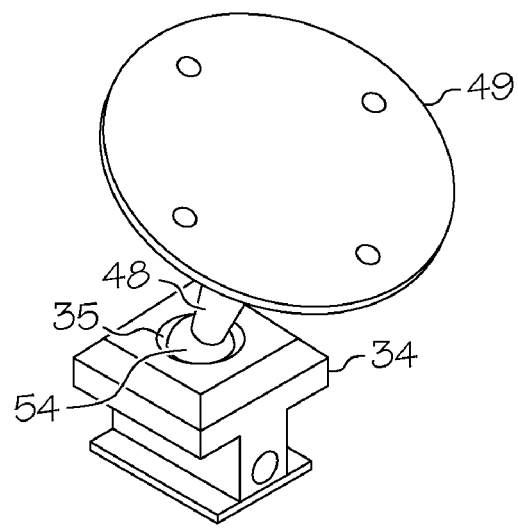
FIG. 6A is a perspective view of the interface of the support shaft bearing and the carriage socket according to a first spherical bearing embodiment, in accordance with the present invention.
Figure 6B:
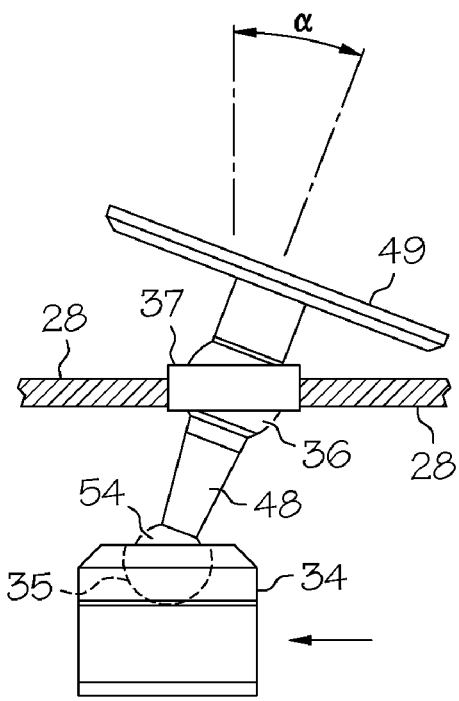
FIGS. 6B and 6C are side views of the interaction of the carriage socket, spherical shaft bearing and the spherical bearing of the shroud, in accordance with the present invention.
Figure 6C:
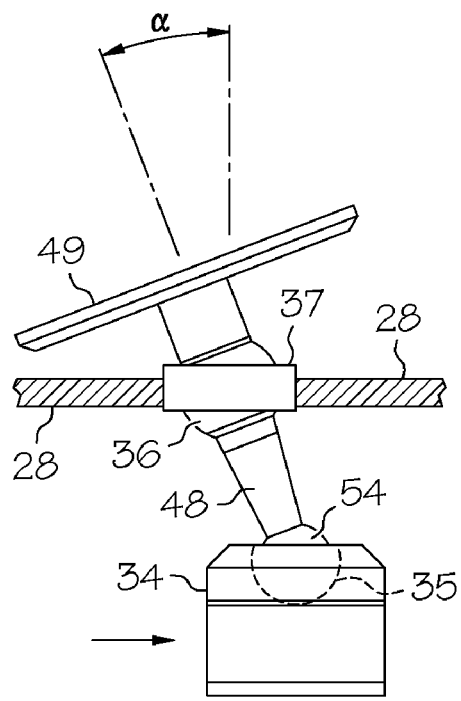

FIG. 6A is a perspective view of the interface of the support shaft bearing 54 and the carriage socket 35 in accordance with the embodiment described above. FIGS. 6B and 6C are side views of the interaction of the carriage socket 35, spherical support shaft bearing 54 and the spherical bearing 36, 37 of the shroud 28. The socket, or fixed portion 37, of the spherical bearing is coupled to the shroud 28, as described above. The ball, or moving portion 36, of the spherical bearing is coupled to the support shaft 48 of the upper body. The support shaft 48 is coupled at a first end to a mounting plate 49, configured to receive an upper body. A second end of the support shaft 48 includes a ball, or spherical, bearing 54 that mates with a spherical socket 35 of the carriage 34, as described above. As shown in the diagrams of FIGS. 6B and 6C, motion in the carriage 34, initiated by the linear actuator, causes the support shaft 48 to pivot, relative to the spherical bearing socket 37 that is fixed in the shroud 28.

Figure 7A:
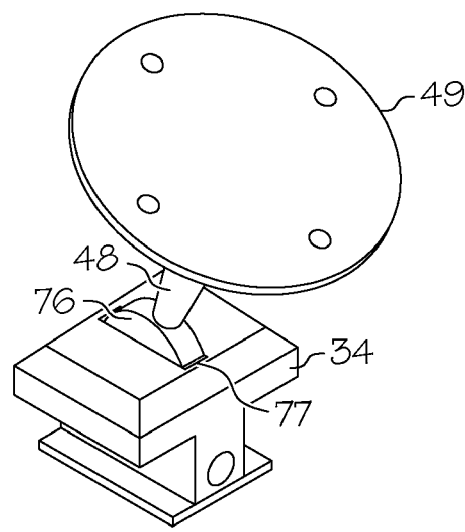
FIG. 7A is a perspective view of the interface of the support shaft bearing and the carriage socket according to a second disk bearing embodiment, in accordance with the present invention.
Figure 7B:
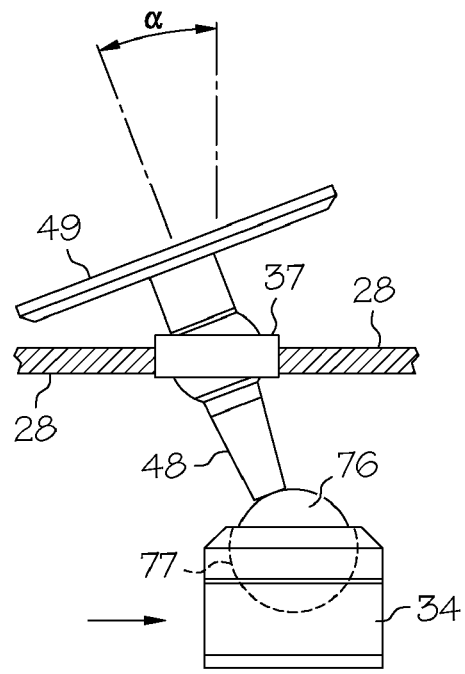
FIGS. 7B and 7C are side views of the interaction of the carriage socket, disk shaft bearing and spherical bearing of the shroud, in accordance with the present invention.
Figure 7C:
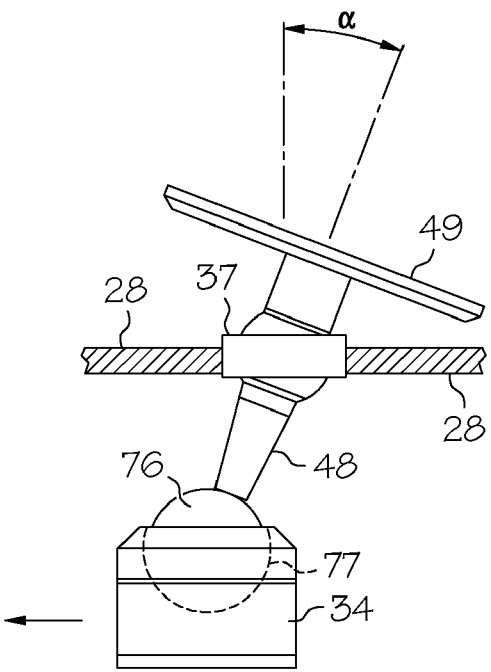

FIG. 7A is a perspective view of an alternative interface of the shaft bearing and the carriage socket, wherein the shaft bearing is in the form of a disk bearing 76 in accordance with the embodiment described above. FIGS. 7B and 7C are side views of the interaction of the corresponding carriage socket 77, disk shaft bearing 76 and the spherical bearing 36, 37 of the shroud 28. In this embodiment, the second end of the support shaft 48 includes a disk-shaped bearing 76 that mates with a corresponding disk-shaped socket 77 of the carriage 34. As shown in the diagrams of FIGS. 7B and 7C, motion in the carriage 34, initiated by the linear actuator, causes the support shaft 48 to pivot, relative to the bearing socket 37 that is fixed in the shroud 28.

While the above example of FIGS. 5A and 5B illustrate the inducement of an inclination angle α in a first direction, assumed to be a positive direction, the carriage 34, and associated linear actuator motor 38 and rail 40 can optionally be configured to allow for inducement of a inclination angle α in the opposite, or negative, direction. Assuming this configuration, by combining the operation of the linear actuator and the rotary actuator 52, all inclination angles and angular orientations of the upper body 22 over a 360 degree range can be achieved by a corresponding 180 degree range of motion in the rotary actuator 52 when a spherical bearing is used as the support shaft bearing, e.g., 54 in FIG. 4 and FIG. 6A. Thus, by optionally limiting the rotary actuator 52 to a 180 degree range in this manner, the pivot actuator 50 motor 38 on the rotating platform 32 can be wired directly, without the need for wireless optical transmission of signals and/or the use of brushes for transferring signals to the rotating platform, since the possibility of full rotation by the platform is eliminated.

Figure 8:
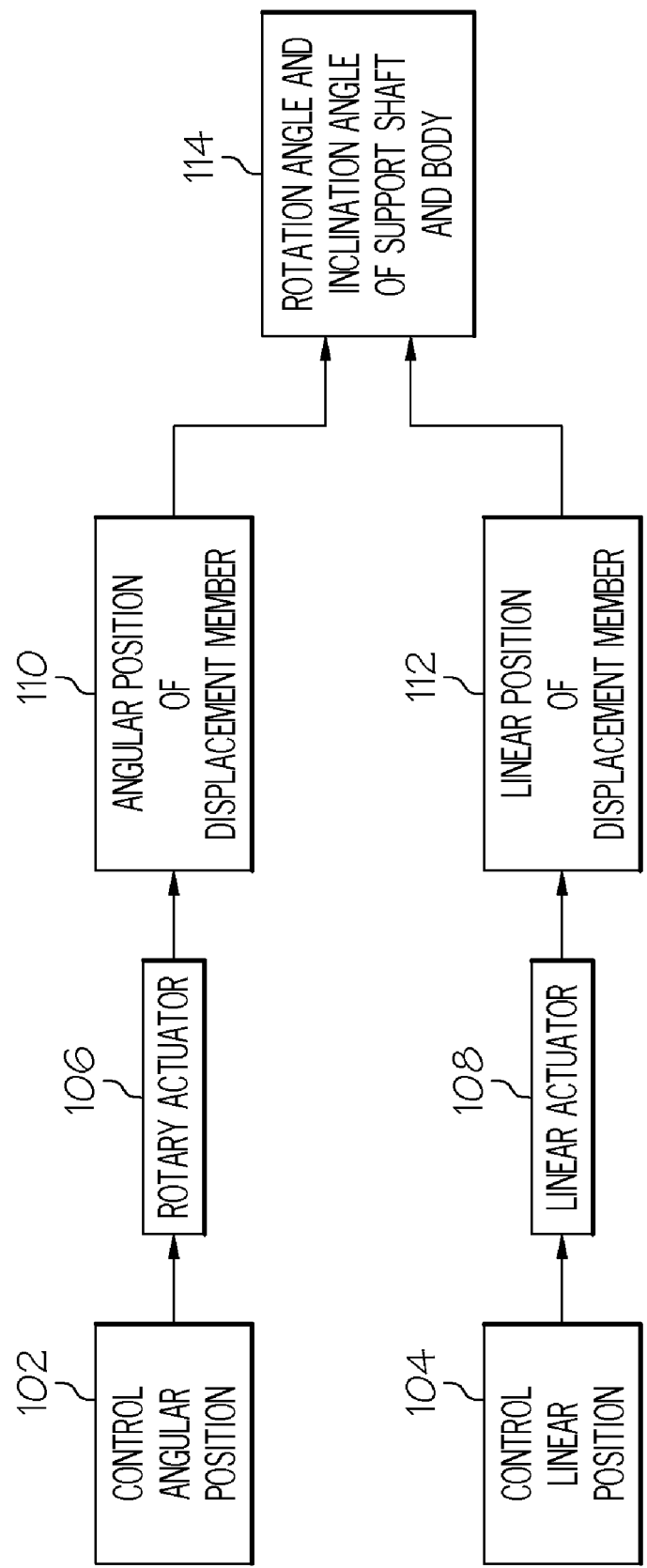
FIG. 8 is a flow diagram of a method of controlling the rotation angle and inclination angle of a body in accordance with the present invention.

FIG. 8 is a flow diagram of a method of controlling the rotation angle and inclination angle of a body in accordance with the present invention. At step 102, a controller determines and transmits the desired angular position of a displacement member about a longitudinal axis of a base to a rotary actuator. The rotary actuator, at step 106, moves the displacement member over a continuous range of angular positions to a desired angular position 110. At step 104, the controller determines and transmits the desired linear position of the displacement member relative to the longitudinal axis of the base to a linear actuator. The linear actuator, at step 108, moves the displacement member over a continuous range of linear positions to a desired linear position 112. As discussed above, the displacement member is pivotably coupled to a support shaft of the body at a first position of the support shaft and the support shaft is pivotably coupled to the shroud at a second position of the support shaft. In this manner, the angular position and linear position of the displacement member is translated to a corresponding rotation angle and inclination angle in the support shaft and corresponding body at step 114.

In this manner, the present invention provides for control over the inclination angle and rotational orientation of the upper body over a continuous range of angles. A continuous range allows for greater precision in orienting the upper body, in contrast with the conventional systems that have a fixed inclination angle and indexed rotational positions. This is accomplished through the use of commercially available stepper motors, rather than specialized mechanical systems, limiting expense, lowering weight, and improving reliability over the conventional approaches. In addition, the weight of the upper body is supported primarily or entirely by the shroud of the base, thereby allowing for greater precision in orienting the upper body, while using lightweight, precise components in the underlying position actuator.

Another advantage of the present invention lies in the ability to self-level or position the upper body of the unit. Illustratively, in the case where a field unit is deployed on a steep bank or hill, the angle of the hill can be compensated for by adjusting the inclination angle of the upper body accordingly. For example, where the unit is deployed on a 10 degree bank, the upper body can be positioned by the positioning actuator to be level and upright, while the base remains perpendicular to the slope of the hill. In this manner, the unit is able to carry out its mission without being limited by the slope. For such a terrain condition, the upper body can be set or positioned anywhere with the continuous inclination and rotation ranges relative the base, whereas, in conventional field units, certain slope angles, when added to the fixed inclination angle of the upper body, would aim the upper body of a field unit in an undesired direction, e.g., into the side of a hill.

While this invention has been particularly shown and described with references to preferred embodiments thereof, it will be understood by those skilled in the art that various changes in form and details may be made herein without departing from the spirit and scope of the invention as defined by the appended claims.

For example, while the above illustration utilizes a spherical bearing for coupling the support shaft 48 of the upper body to the shroud 28, any of a number of different universal joints or gimbals, or other joints, may be employed that allow such freedom of motion. In addition, while a single spherical bearing is employed above, multiple spherical bearings may be nested to allow for a greater range of motion in the upper body relative to the base.

I claim:

1. A method for controlling the inclination angle and rotation angle of a body comprising:
   controlling, using a rotary actuator, the angular position of a displacement member about an axis of rotation of the rotary actuator over a continuous range of angular positions; and
   controlling, using a linear actuator, the linear position of the displacement member relative to the axis of rotation of the rotary actuator along a linear axis over a continuous range of linear positions, the angular position and the linear position of the displacement member being relative to the axis of rotation of the rotary actuator,
   the displacement member being pivotably coupled to a support shaft of the body at a first position of the support shaft and the support shaft being pivotably coupled to the base at a second position of the support shaft such that the angular position and linear position of the displacement member is translated to a corresponding rotation angle and inclination angle in the support shaft, the axis of rotation of the rotary actuator intersecting the support shaft at the second position of the support shaft over the continuous range of angular positions and over the continuous range of linear positions of the displacement member.

2. The method of claim 1 further comprising coupling the body to the support shaft.

3. The method of claim 2 wherein the step of coupling the body comprises coupling a cylindrical canister containing sensors or munitions to the support shaft.

4. The method of claim 1 wherein the step of controlling the angular position includes using a stepper motor.

5. The method of claim 1 wherein the step of controlling the linear position includes inducing motion in a threaded screw.

6. The method of claim 5 wherein the step of inducing motion in the threaded screw includes communicating with a displacement carriage of the displacement member.

7. The method of claim 1 wherein the step of controlling the linear position includes inducing linear motion in a non-threaded output shaft, the output shaft communicating with the displacement member for inducing linear motion in the displacement member.

8. The method of claim 1 further comprising housing the base in a shroud and pivotably coupling the support shaft to the shroud at a point along a longitudinal axis of the base.

9. The method of claim 8 further comprising coupling the body having a weight to the support shaft and substantially supporting the weight by the shroud.

10. The method of claim 8 wherein the step of pivotably coupling the support shaft includes using a spherical bearing.

11. The method of claim 1 further comprising determining a desired inclination angle and a desired rotation angle of the body relative to the base.

12. The method of claim 11 further comprising determining, at an automated controller, a desired angular position of the displacement member about the axis of rotation of the rotary actuator, and determining a desired linear position of the displacement member relative to the axis of rotation of the rotary actuator in response to the desired inclination angle and rotation angle of the body.

13. The method of claim 12 further comprising transmitting a signal indicative of the desired angular position from the automated controller to the rotary actuator, and transmitting a signal indicative of the desired linear position from the automated controller to the linear actuator.

14. A method for positioning a body comprising:
   inclining a support shaft through a continuous range of inclination angles relative to an axis of rotation of a rotary actuator by moving a first portion of the support shaft along a linear axis relative to the axis of rotation of the rotary actuator using a linear actuator;
   rotating, using the rotary actuator, the support shaft through a continuous range of rotation angles about, and relative to, the axis of rotation of the rotary actuator; and
   moving the body coupled to a second portion of the support shaft to a desired rotation angle and inclination angle relative to the axis of rotation of the rotary actuator, the support shaft being pivotably coupled to the base at a third portion of the support shaft, the axis of rotation of the rotary actuator intersecting the support shaft at the third portion of the support shaft over the continuous range of inclination angles and over the continuous range of rotation angles of the support shaft.

15. The method of claim 14 wherein the rotary actuator comprises a stepper motor.

16. The method of claim 14 wherein the linear actuator comprises a stepper motor that induces motion in a threaded screw, and wherein the support shaft is coupled to the linear actuator at a displacement member, the threaded screw communicating with a corresponding thread in the displacement member for inducing linear motion in the displacement member.

17. The method of claim 14 wherein the linear actuator comprises a stepper motor that induces linear motion in an output shaft, and wherein the support shaft is coupled to the linear actuator at a displacement member, the output shaft communicating with the displacement member for inducing linear motion in the displacement member.

18. The method of claim 14 further comprising determining, at an automated controller, a desired rotation angle and a desired inclination angle of the body coupled to the support shaft, relative to the base, and transmitting commands related to the desired rotation angle and inclination angle of the body.

19. The method of claim 18 wherein the first portion of the support shaft is moved along the linear axis by the linear actuator in response to the commands.

20. The method of claim 18 wherein the support shaft is rotated about, and relative to, the axis of rotation of the rotary actuator, by the rotary actuator, in response to the commands.

21. A method for controlling the inclination angle and rotation angle of a body comprising:
   determining a desired inclination angle and rotation angle of a body relative to a base;
   determining, at an automated controller, a desired angular position of a displacement member about an axis of rotation of a rotary actuator and determining a desired linear position of the displacement member relative to the axis of rotation of the rotary actuator in response to the desired inclination angle and rotation angle of the body;
   transmitting a first signal indicative of the desired angular position from the automated controller to the rotary actuator;
   transmitting a second signal indicative of the desired linear position from the automated controller to a linear actuator;

controlling, using the rotary actuator, the angular position of the displacement member about the axis of rotation of the rotary actuator over a continuous range of angular positions, in response to the transmitted first signal; and controlling, using the linear actuator, the linear position of the displacement member along a linear axis over a continuous range of linear positions, in response to the transmitted second signal, the displacement member being pivotably coupled to a support shaft of the body at a first position of the support shaft and the support shaft being pivotably coupled to the base at a second position of the support shaft such that the angular position and linear position of the displacement member is translated to a corresponding desired rotation angle and inclination angle in the support shaft and body.

22. The method of claim 21 wherein the angular position and the linear position of the displacement member is controlled relative to the axis of rotation of the rotary actuator.

23. The method of claim 21, wherein the axis of rotation of the rotary actuator intersects the support shaft at the second position of the support shaft over the continuous range of angular positions and over the continuous range of linear positions of the displacement member.

24. A method for positioning a body comprising:
determining, at an automated controller, a desired rotation angle and a desired inclination angle of a body coupled to a support shaft, relative to a base, and transmitting commands related to the desired rotation angle and inclination angle of the body;

inclining the support shaft through a continuous range of inclination angles by moving a first portion of the support shaft along a linear axis using a linear actuator, in response to the commands;

rotating, using a rotary actuator, the support shaft through a continuous range of rotation angles about, and relative to, an axis of rotation of the rotary actuator, in response to the commands, the moving of the first portion of the support shaft along the linear axis being relative to the axis of rotation of the rotary actuator; and moving the body coupled to a second portion of the support shaft to the desired rotation angle and inclination angle relative to the axis of rotation of the rotary actuator, the support shaft being pivotably coupled to the base at a third portion of the support shaft, the third portion of the support shaft being between the first and the second portions of the support shaft.

25. The method of claim 24, wherein the axis of rotation of the rotary actuator intersects the support shaft at the third portion of the support shaft over the continuous range of inclination angles and over the continuous range of rotation angles of the support shaft.

* * * * *